(12) United States Patent
Kaufman et al.

(10) Patent No.: US 7,403,851 B2
(45) Date of Patent: Jul. 22, 2008

(54) METHOD OF OPERATING A NAVIGATION SYSTEM TO REPORT EFFECTS OF UPDATED PORTIONS OF A GEOGRAPHIC DATABASE

(75) Inventors: Michael L. Kaufman, Chicago, IL (US); Christian Andreas Hecht, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 687 days.

(21) Appl. No.: 10/955,523

(22) Filed: Sep. 30, 2004

(65) Prior Publication Data

US 2006/0074547 A1 Apr. 6, 2006

(51) Int. Cl.
G00C 21/00 (2006.01)
G06F 19/00 (2006.01)

(52) U.S. Cl. .................. 701/200; 701/209; 707/203; 717/170

(58) Field of Classification Search .......... 701/200, 701/201, 207, 210, 211, 209; 707/100, 2, 707/200, 201, 104.1, 203; 717/168.17, 173, 717/178

See application file for complete search history.

(56) References Cited

U.S. PATENT DOCUMENTS

| | | | |
|---|---|---|---|
| 5,363,473 A | 11/1994 | Stolfo et al. ................. | 395/50 |
| 5,524,202 A | 6/1996 | Yokohama ................. | 395/161 |
| 5,614,895 A | 3/1997 | Ohomori et al. ............ | 340/995 |
| 5,684,989 A | 11/1997 | Nissato ...................... | 395/617 |
| 5,806,018 A | 9/1998 | Smith et al. ................. | 701/211 |
| 5,893,113 A | 4/1999 | McGrath et al. ............ | 707/200 |
| 5,951,620 A | 9/1999 | Ahrens et al. ............... | 701/200 |
| 5,974,419 A | 10/1999 | Ashby ....................... | 707/100 |
| 6,075,467 A * | 6/2000 | Ninagawa ............... | 340/995.14 |
| 6,121,924 A | 9/2000 | Meek et al. ............ | 342/357.13 |
| 6,230,098 B1 | 5/2001 | Ando et al. ................. | 701/208 |
| 6,343,301 B1 * | 1/2002 | Halt et al. .................... | 707/203 |
| 6,453,233 B1 | 9/2002 | Kato .......................... | 701/208 |
| 6,542,816 B1 * | 4/2003 | Ito et al. ...................... | 701/209 |
| 6,546,334 B1 | 4/2003 | Fukuchi et al. ............. | 701/208 |

(Continued)

OTHER PUBLICATIONS

Bastiaensen E., et al.: "Specification of actualization strategies, map components version control and interfaces" Internet Publication, [Online] Aug. 28, 2003 XP002391250, www.ertico.com/download/actmap_public_documents/2_065v11-D31-final.pdf>.

(Continued)

Primary Examiner—Tan Q Nguyen
(74) Attorney, Agent, or Firm—Lisa M. Schoedel; Frank J. Kozak; Jon D. Shutter

(57) ABSTRACT

A method for operating a navigation system that executes a navigation application software program to provide a navigation-related feature is provided. The method comprises identifying that the navigation application software program uses both updated geographic data and un-updated geographic data from a geographic database associated with said navigation system. The un-updated geographic data has an associated date or version different from the updated geographic data. The method further comprises providing a report indicating that an inconsistency between the updated geographic data and the un-updated geographic data may exist. The method may further include identifying the inconsistency between the updated geographic data and the un-updated geographic data.

20 Claims, 13 Drawing Sheets

U.S. PATENT DOCUMENTS

| | | | |
|---|---|---|---|
| 6,549,847 B2* | 4/2003 | Ikeuchi et al. | 701/208 |
| 6,636,802 B1 | 10/2003 | Nakano et al. | 701/208 |
| 6,704,649 B2 | 3/2004 | Miyahara | 701/208 |
| 6,718,258 B1* | 4/2004 | Barton | 701/200 |
| 6,766,248 B2 | 7/2004 | Miyahara | 701/208 |
| 6,782,319 B1 | 8/2004 | McDonough | 701/208 |
| 6,845,319 B2 | 1/2005 | Uchia | 701/208 |
| 6,873,998 B1* | 3/2005 | Dorum et al. | 707/104.1 |
| 6,937,936 B2 | 8/2005 | Nimura | 701/208 |
| 7,024,307 B2* | 4/2006 | Ito et al. | 701/208 |
| 2002/0029224 A1 | 3/2002 | Carlsson | 707/104.1 |
| 2004/0002812 A1* | 1/2004 | Yamanaka | 701/208 |
| 2004/0054465 A1 | 3/2004 | Hmaguchi et al. | 701/208 |
| 2004/0133343 A1 | 7/2004 | Hashida et al. | 701/208 |
| 2004/0133344 A1 | 7/2004 | Hashida et al. | 701/208 |
| 2005/0114018 A1 | 5/2005 | Umezu et al. | 701/208 |

OTHER PUBLICATIONS

Bastiaensen E., et al.: "ACTMAP: Real-Time Map Updates for Advanced In-Vehicle Applications" Internet Publication, [Online] Dec. 2003 XP002391251, www.ertico.com/download/actmap/_public_documents/2_ActMAP-Article_ITS-v1.2.pdf>.

* cited by examiner

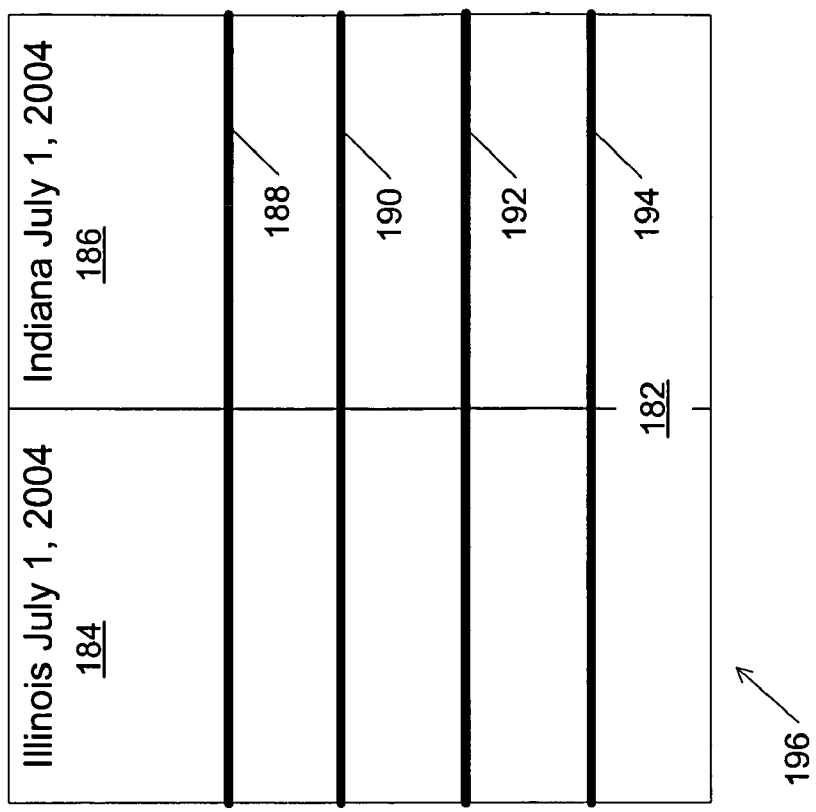
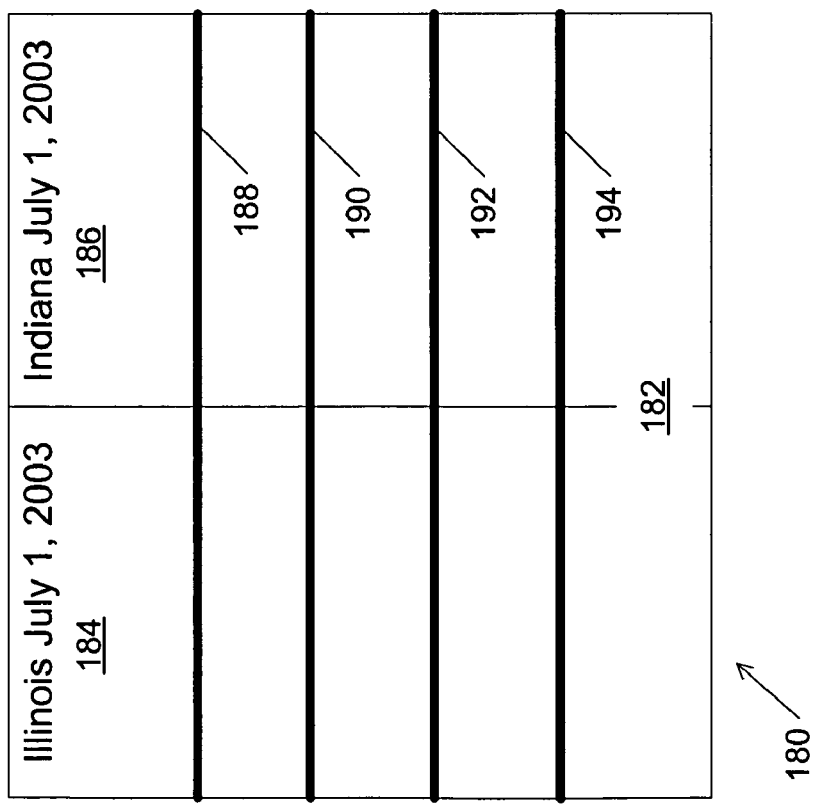
FIG. 12

METHOD OF OPERATING A NAVIGATION SYSTEM TO REPORT EFFECTS OF UPDATED PORTIONS OF A GEOGRAPHIC DATABASE

BACKGROUND OF THE INVENTION

The present invention relates to a method and system for operating a navigation system, and more particularly to a method and system for operating a navigation system to report the effects of updated portions of a geographic database.

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. There is a need to gather and organize comprehensive, detailed, reliable, and up-to-date data about geographic regions. There is also a need to update the geographic data. Just like conventional printed maps, geographic data used in computer-based navigation systems can become out-of-date. For example, new roads are built, businesses change locations, road construction closes roads, detours are established, museum and restaurant hours change, and so on. Additionally, the accuracy of the geographic data may improve due to improved data collection techniques.

In one known system, updated versions of geographical information are released on a periodic basis. In this known system, a user who wants to update his or her geographic database is required to replace his or her entire previous geographic database with a new version. This can be burdensome and time consuming because of the large amount of data involved, much of which is identical to the data in the user's previous version of the geographic database. Furthermore, in such a system, new releases of geographic data may be made on a fixed periodic schedule (e.g., every several months such as every three months). Thus, a user's geographic database has the potential for being out-of-date thereby decreasing its usefulness.

In another system, rather than replacing the entire previous geographic database with a new version, a portion of the previous geographic database is replaced or modified to reflect updated geographic data. One downside of updating a portion of the geographic data is the effects of the partially updated geographic data may have on the navigation-related functions and features. Accordingly, a method and system are desired that would identify whether the navigation-related feature uses a combination of previously released geographic data and updated geographic data. Further, there is a need for reporting to the user of the navigation system the effects on the navigation-related functions and features due to the partially updated geographic database.

SUMMARY OF THE INVENTION

To address these and other objectives, the present invention comprises a method for operating a navigation system that executes a navigation application software program to provide a navigation-related feature. The method comprises identifying that the navigation application software program uses both updated geographic data and un-updated geographic data from a geographic database associated with said navigation system. The un-updated geographic data has an associated date or version different from the updated geographic data. The method further comprises providing a report indicating that an inconsistency between the updated geographic data and the un-updated geographic data may exist. The method may further include identifying the inconsistency between the updated geographic data and the un-updated geographic data.

According to another aspect, the present invention comprises a navigation system. The navigation system comprises a geographic database containing geographic data representing features in a geographic region. The geographic database is capable of receiving an incremental update. The incremental update changes a previously released geographic dataset of the geographic database to provide an updated dataset and an un-updated dataset. The updated dataset including changes to the previously released geographic dataset, and the un-updated dataset includes a portion of the previously released geographic dataset. The navigation system also comprises a navigation application software program determining whether both the updated geographic dataset and the un-updated geographic dataset are used to provide a navigation-related feature.

BRIEF DESCRIPTION OF THE DRAWINGS

An exemplary embodiment of the present invention is described herein with reference to the following drawings.

FIG. 12 shows maps of a geographic region as represented by a master geographic database on Jul. 1, 2003 and on Jul. 1, 2004.

DETAILED DESCRIPTION OF THE PRESENTLY PREFERRED EMBODIMENTS

I. Navigation System

Figure 1:
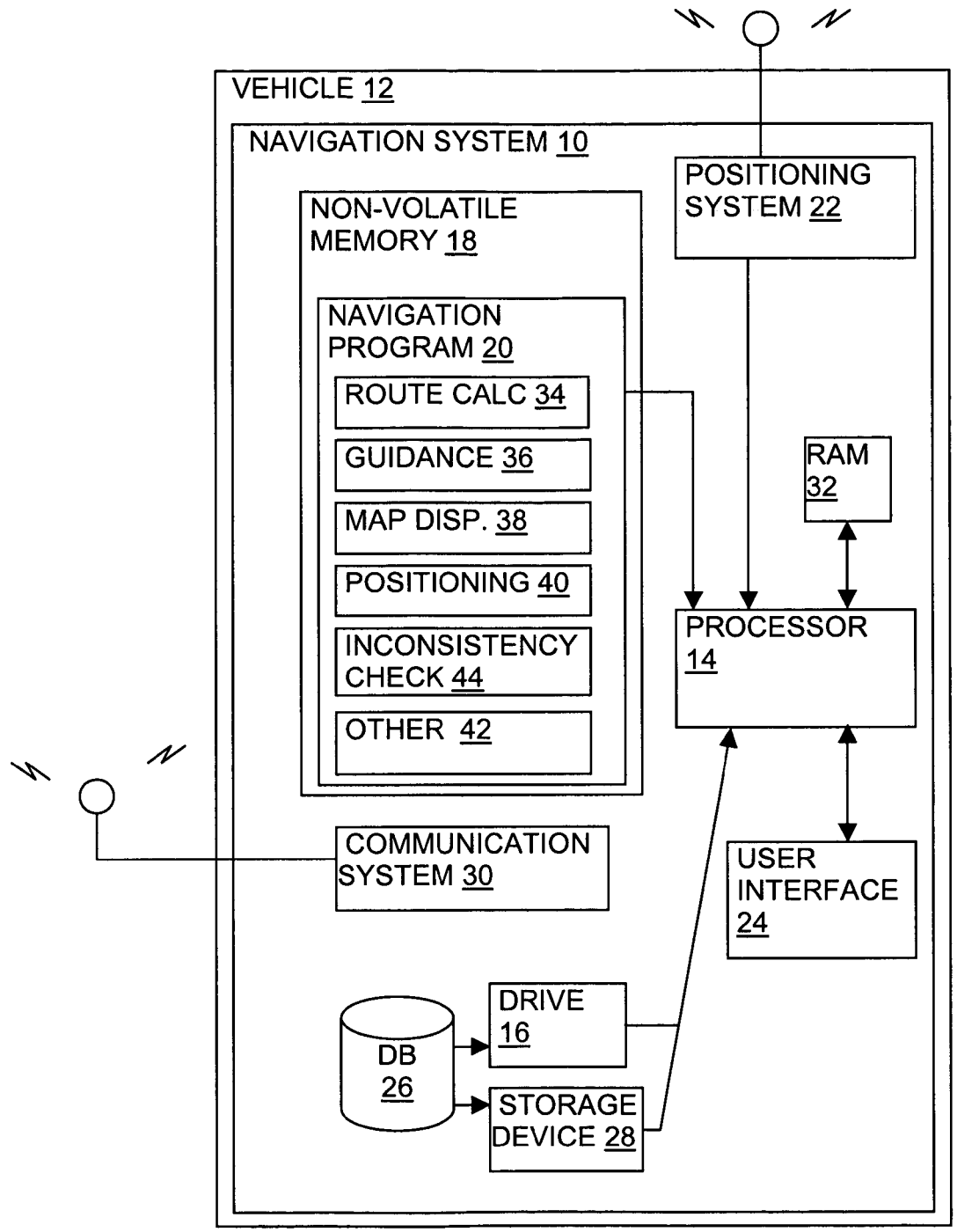
FIG. 1 is a block diagram of a navigation system, according to an exemplary embodiment.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26. In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion of the geographic database 26 is stored. In another embodiment, the geographic database 26 is stored on a hard disk. In one embodiment, the geographic database 26 may be a geographic database published by NAVTEQ North America, LLC of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 32 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching).

Other functions and programming 42 may be included in the navigation system 10. The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
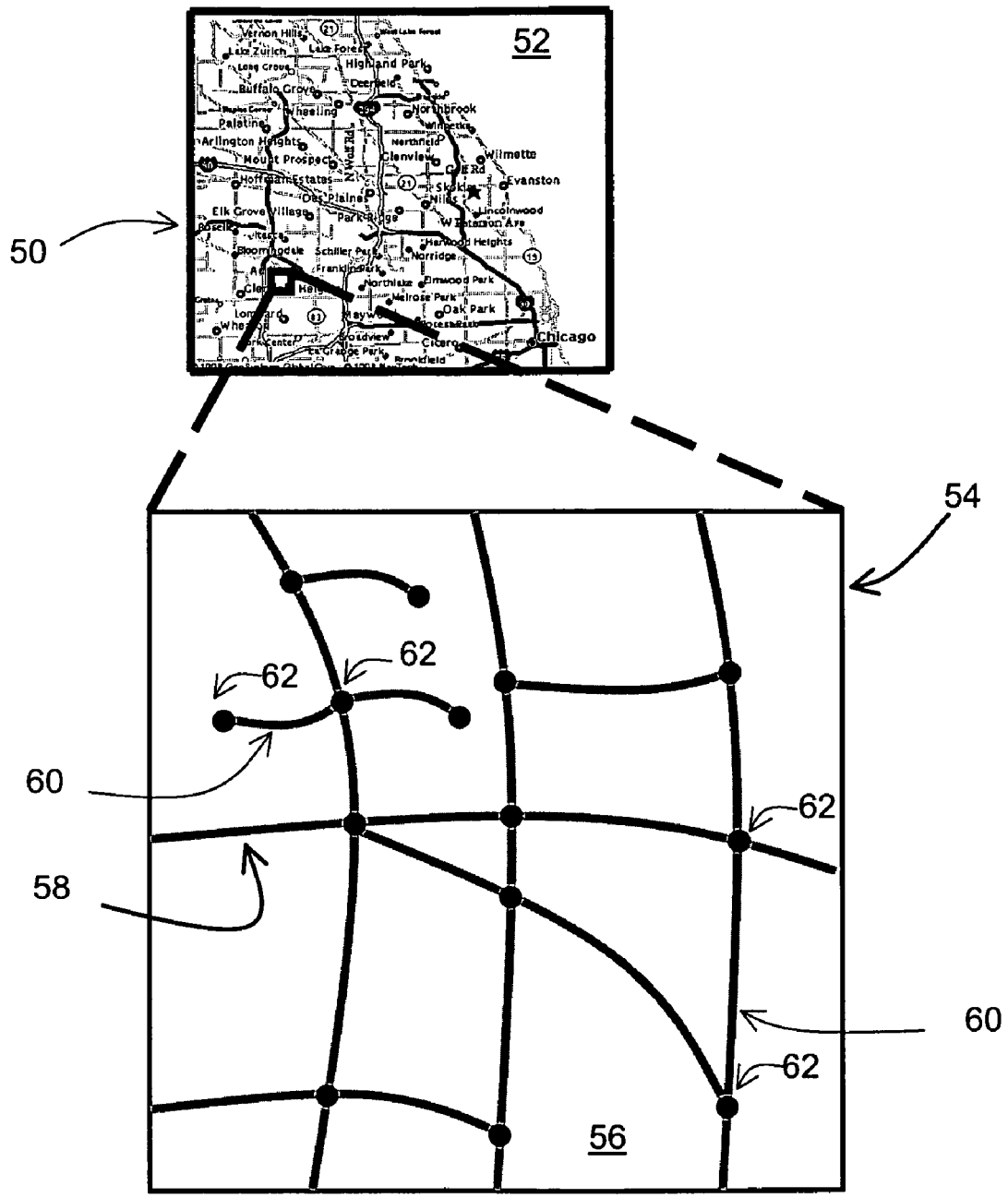
FIG. 2 shows a map of a geographic region.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
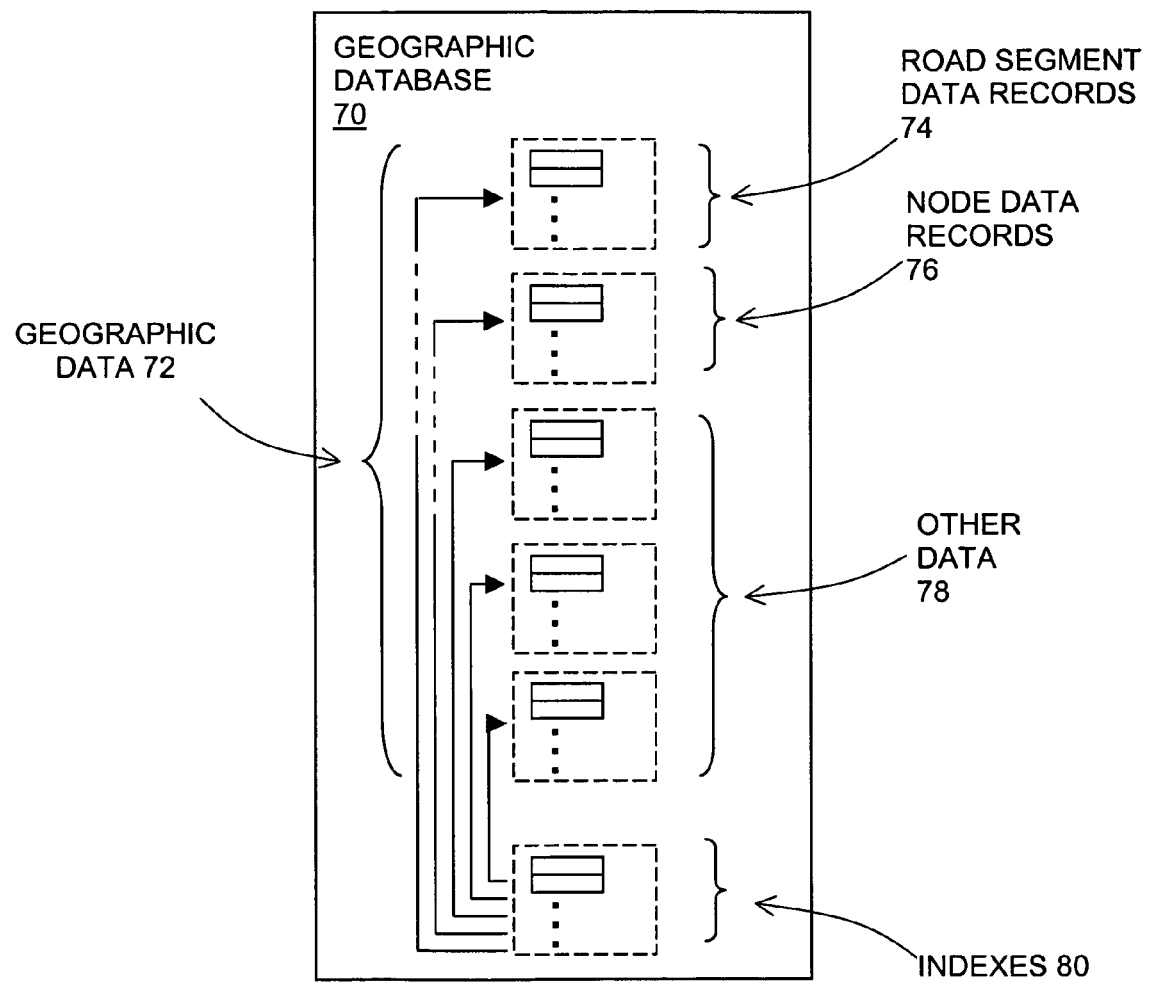
FIG. 3 is a block diagram of a geographic database that represents the geographic region of FIG. 2.

Referring to FIG. 3, a geographic database 70 contains data 72 that represents some of the physical geographic features in the geographic region (52 in FIG. 2). The data 72 contained in the geographic database 70 includes data that represent the road network 58. In the embodiment of FIG. 3, the geographic database 70 that represents the geographic region 52 contains at least one database record 74 (also referred to as "entity" or "entry") for each road segment 60 in the geographic region 52 in FIG. 2. The road segment record 74 may includes a segment ID by which the data record can be identified in the geographic database 70. Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on. The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment. The road segment data record 74 may also include or be associated with other data that refer to various other attributes of the represented road segment. The various attributes associated with a road segment may be included in a single road segment record, or may be included in more than one type of record which are cross-referenced to each other. For example, the road segment data record 74 may include data identifying what turn restrictions exist at each of the nodes which correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment. The geographic database 70 also includes indexes 80. The indexes 80 may include various types of indexes that relate the different types of data to each other or that relate to other aspects of the data contained in the geographic database 70.

One way that the accessing of geographic data 72 can be enhanced for performing various navigation-related functions and features is to provide separate collections or subsets of the geographic data for use by each of the separate functions and features in the navigation application software programs 20. Each of these separate subsets is tailored specifically for use by one of the functions. For instance, the route calculation function normally uses only a portion of all the information in the geographic database that is associated with a segment of a road. For example, when the route calculation function is being run, it may require information such as the speed of travel along a road segment, turn restrictions from one road segment to another, stop lights at intersections of road segments, and so on. However, the route calculation function does not normally require the name of the road to calculate an optimum route. Similarly, when using the map display function, some of the information associated with a road segment, such as the speed limits or turn restrictions, is not required. Instead, when the map display function is run, it uses only a portion of the information associated with the road segment, such as the shapes and locations of roads, and possibly the names of the roads. Even further, when the maneuver function is being run, some of the information associated with a segment of a road, such as the speed restrictions, is not required. Instead, when the maneuver function is being run, it uses information that includes the name of the road represented by the road segment data entity, the address range along the road segment, any signs along the road segment, and so on. Although there may be some overlap as to the types of information used by the various navigation-related functions and features, some of the data used by any one of these navigation-related functions and functions is not used by another of the functions. If all the information relating to each road segment were associated with it as a single data entry in a single database, each data entity record would be relatively large. Thus, whenever any one of the navigation-related functions accessed an entity record, it would have to read into memory a significant amount of information much of which would not be needed by the navigation-related function. Moreover, when reading the data entity from storage medium and/or storage device, relatively few data entities could be read at a time since each data entity would be relatively large.

Figure 4:
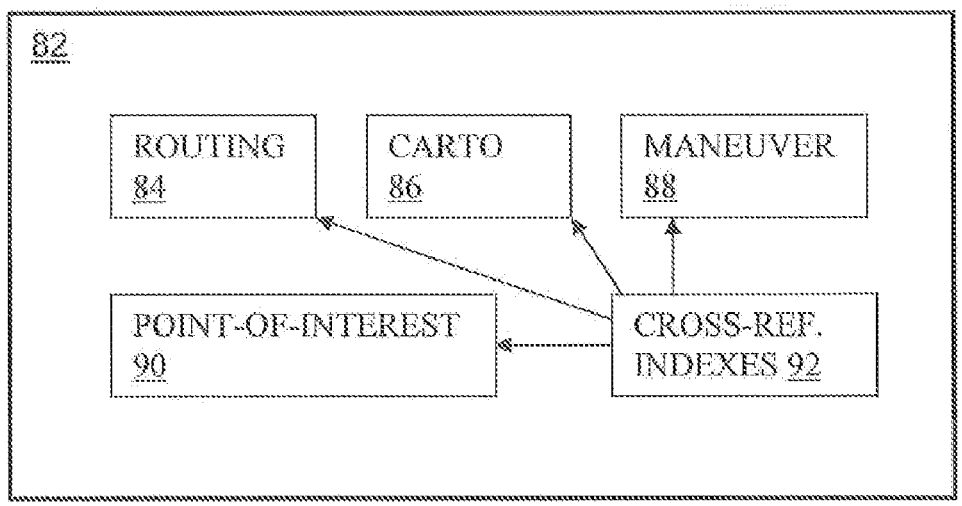
FIG. 4 is a diagram illustrating a geographic database having separate subsets of data for use with navigation application programs.

In order to provide the information in the geographic database 70 in a format more efficient for use by each of the navigation-related functions, separate subsets of the entire geographic database for a given geographic region are provided for the different types of navigation-related functions to be provided in the navigation application software programs 20. FIG. 4 illustrates a geographic database 82 comprised of separate routing data 84, cartographic data 86 (for map display), maneuver data 88, and points-of-interest data 90. A geographic database may be defined with fewer or more subsets than these, and other types of data may be defined and included.

Each subset of data includes only the data required to be used by a particular navigation-related function. There is some overlap of data between each of these subsets, with the result that some parts of the information may be included in more than one subset. For example, both the road segment data entity in the routing data subset as well as the road segment data entity in the cartographic data subset may include attributes identifying the nodes located at the ends of the segments. Although this duplication may result in an larger overall data storage requirement, each of the navigation application software programs 20 benefits from the resultant efficiency of handling smaller amounts of data.

Although the division of the geographic data into subsets provides for efficient use of the data by each of the different navigation-related functions, it becomes necessary to provide that the different navigation-related functions that use these different subsets of the database work together. For example, after a user obtains a calculated route, it may be desired to display a map on a computer display with the calculated route highlighted. In order to accomplish this, the routing subset of geographic data is accessed first to obtain the routing road segment data entities for the optimum route, and then the cartographic subset of the geographic database is accessed to obtain the cartographic road segment data entities corresponding to the routing data entities. To permit these data subsets to work together, cross referencing indexes 92 may be provided, or other search techniques may be provided.

Another way that the geographic data can be organized to enhance their use is to provide the data in layers. Some of the navigation-related functions use the data at different levels of detail. The map display function is an example of this type of function. When using the map display function, it is sometimes desired to provide for panning and zooming. Zooming can be done more efficiently if the data are organized into layers, with greater detail at the lower layers and less detail at the higher layers. When using the route calculation function, it is also advantageous to use the data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data, the geographic data are provided in separate collections or groups corresponding to separate layers.

Figure 5:
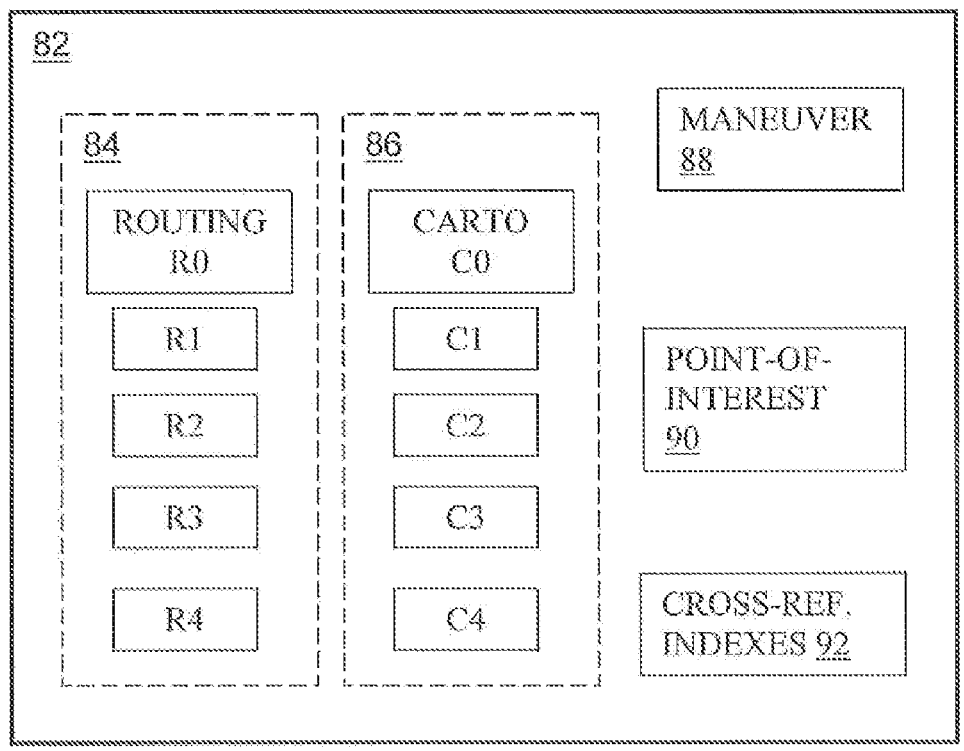
FIG. 5 is a diagram similar to FIG. 4 illustrating both separate subsets of data types and separate layers of data in some of the types.

To implement layering, data entities, such as road segment data entities, are provided with a "rank." The "rank" of a road segment may be related to its functional class with road segments having a rank of "0" being slowest and narrowest, road segments having a rank of "1" being larger and faster, road segments having a rank of "2" being major roads, and so on. The "rank" of a segment data entity also specifies the highest data layer in which a road segment entity exists. For example, referring to FIG. 5, the route calculation subset of geographic data 84 may include five separate collections of the data, RO, R1, R2, R3, and R4, each with a different level of detail, which can be used by the route calculation function. Similarly, the cartographic (i.e., map display) subset of geographic data 86 may include five separate collections of the data, C0, C1, C2, C3, and C4, each with a different level of detail, which can be used by the map display.

In the routing subset of the geographic database, layer 0 (R0) includes segment data entities corresponding to all the portions of all the roads in the geographic region. Level 1 of the routing data comprises a separate subset (or collection) of the routing data and includes only the routing segment data entities (and their corresponding routing data attributes) having a rank of level 1 or higher. Level 2 of the routing data comprises a separate subset of the routing data and includes only the routing segment data entities (and their corresponding navigation data attributes) having a rank of level 2 or higher, and so on.

Similarly, the cartographic subset of geographic data may include separate collections (layers) of the data used by the map display function, each with a different level of detail. In the cartographic subset of the geographic database, layer 0 includes segment data entities (and corresponding data attributes) corresponding to all the portions of all the roads in the geographic region. Level 1 of the cartographic data comprises a separate subset of the cartographic data and includes only the cartographic segment data entities (and corresponding data attributes) having a rank of level 1 or higher, and so on. Using these different layers of cartographic data, the map display function can provide rapid panning and zooming.

Although the organization of some of the data into layers results in a duplication of some of the data, the increased efficiency provided by layering of some of the data generally offsets any disadvantages. As with the use of separate types of data mentioned above, the need arises to allow these layers to work together. Cross referencing indexes 92 may be provided, or other search techniques may be provided.

Organizing the data into subsets or types and layering the data of some of the types provides separate collections of the data in sizes that are more manageable by each of the navigation-related functions. With respect to each subset and each layer of data, the data can be further organized to facilitate spatial access.

Figure 6:
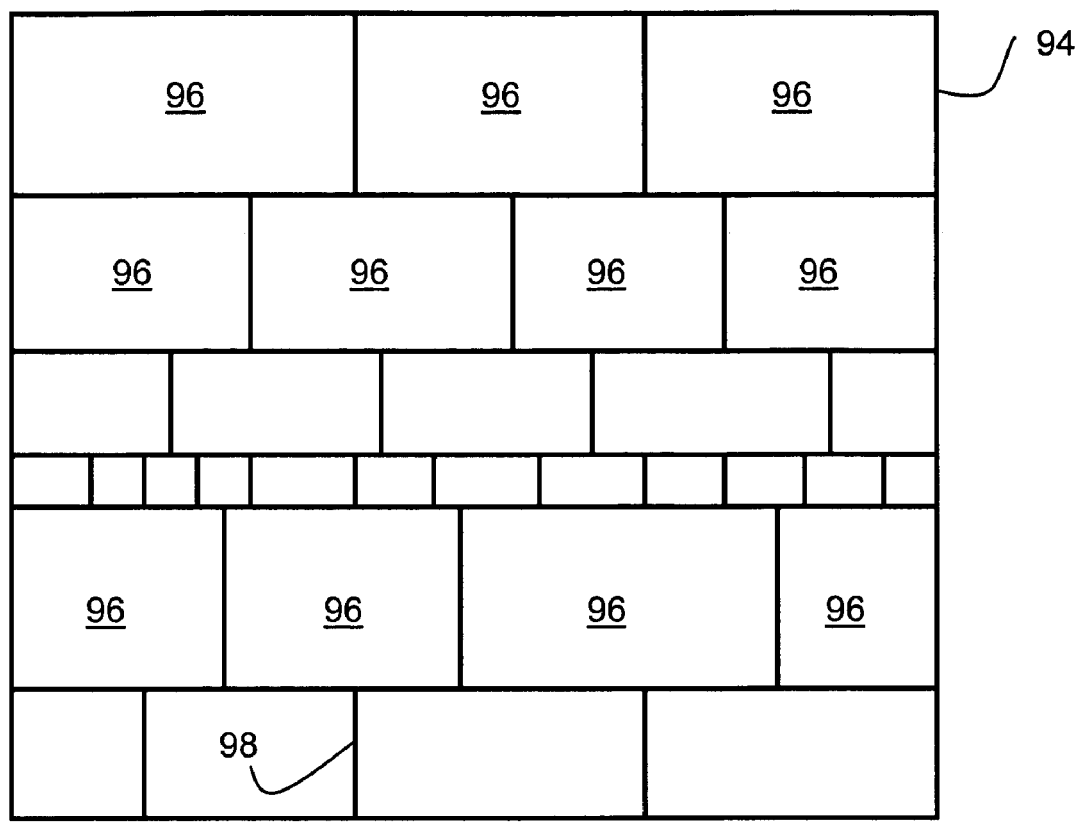
FIG. 6 is a map of a geographic region illustrating parcelization.

Generally, it is desired to store data representing geographic features, such as roads, spatially based upon the physical proximity of the geographic features that they represent. Data records that are physically (or logically) close together in the map database (and possibly also close together on a storage medium upon which the map data are stored) represent geographic features that are close together physically in the geographic region. To spatially organize data representing geographic features, the data representing the geographic features are organized into parcels. Each parcel of data includes data representing features that are located physically proximate to each other in the geographic region. Each parcel includes data that represent physical features encompassed within a geographic area of a size, shape and position determined by a parcelization method. (For purposes of forming the data into parcels, the data are first separately organized into the different types, as described above, based upon the functions that access them, such as routing, map display, and maneuver generation. Further, the data are also organized into layers, as mentioned above, based upon rank.) Parcelizing data spatially requires determining the size, shape, and position of the geographic areas that encompass the data which form each parcel. Parcelization methods for organizing map data spatially are described in U.S. Pat. Nos. 5,974,419, and 6,782,319, the entire disclosures of which are incorporated by reference herein. FIG. 6 illustrates an example of a geographic region 94 organized into a plurality of parcels 96. Parcels 96 are separated and defined by parcel boundaries 98.

III. Updating the Geographic Database

Referring to FIG. 1, in order for the navigation system 10 to provide reliable and accurate navigation-related functions and features, the geographic database 26 used by the navigation system 10 needs to be up-to-date. Just like conventional printed maps, geographic data used in computer-based navigation systems can become out-of-date. For example, new roads are built, businesses change locations, road construction closes roads, detours are established, museum and restaurant hours change, and so on. Additionally, the accuracy of the geographic data may improve due to improved data collection techniques.

Figure 7:
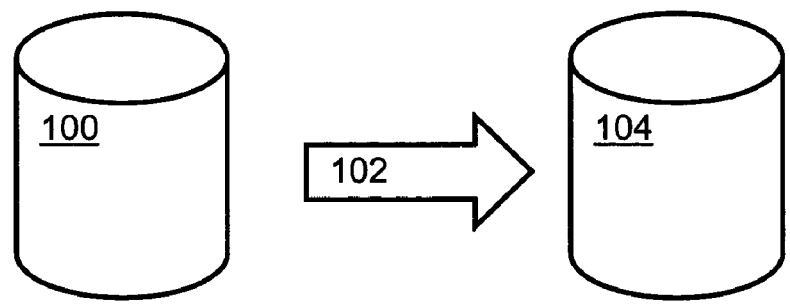
FIG. 7 is a block diagram illustrating an update transaction for a geographic database.

In one embodiment, the geographic database 26 associated with the navigation system 10 is provided with updates. An update for the geographic database is a description of a change to previously released geographic data. The alteration is stated in terms of an existing, known geographic data set comprising the geographic database. When this alteration is processed, it results with a potentially new set of geographic data for the geographic database. Referring to FIG. 7, a known geographic data set 100 undergoes an update 102 resulting in a new geographical data set 104 for the geographic database. The act of describing a change to a known data set is comprised of unambiguously identifying database elements and describing alterations to those elements in context of the known data set. The basic types of alterations which can be executed on an existing dataset are: (1) introduce new, previously not-known data to the dataset, (2) remove existing, known data to the data set, and (3) change the state of a known value to have new data values.

Figure 8:
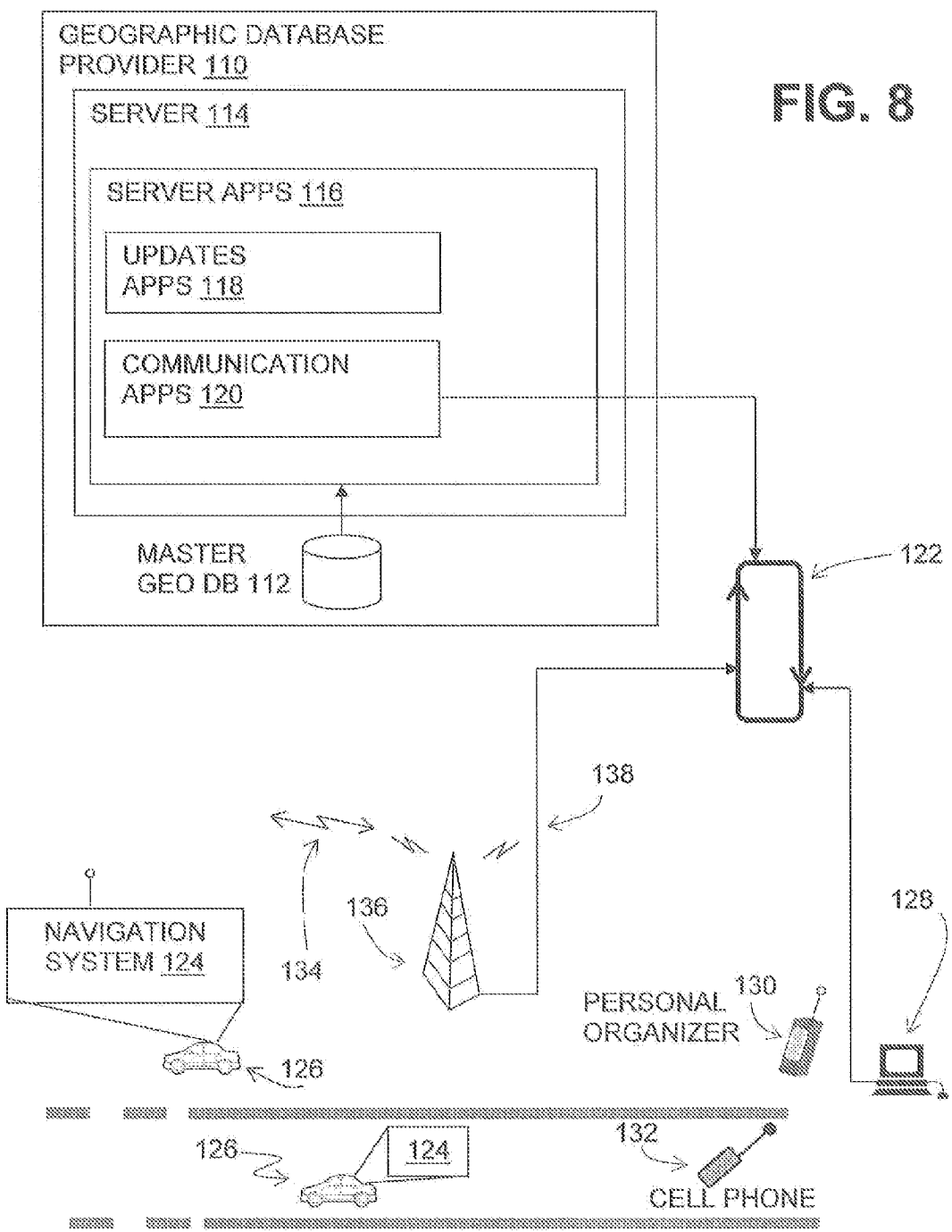
FIG. 8 is a block diagram of a system for providing geographic database updates to end users.

FIG. 8 illustrates an exemplary embodiment of a system for providing updates to end user geographic databases. A geographic database provider 110 maintains a master geographic database 112. The master geographic database 112 contains an up-to-date data set provided by geographic researchers. The master geographic database 112 may be stored on one or more hard drive(s) or other storage media. In one embodiment, the master geographic database may maintain several versions of datasets to support different formats of various end user computing platforms. Additionally, the master geographic database 112 may include a revision history to identify changes made to the master geographic database 112.

A server 114 includes server applications 116 that may be stored on one or more hard drive(s) or other media operated by the server 114 and loaded into a memory of the server 114 to run. One of the server applications 116 is an updates application 118, and another of the server applications is a communications application 120. The communications application 120 interfaces with a data network 122 in order to receive messages from and send messages to a plurality of end users.

Referring to FIG. 8, several types of computing platforms operated by the end users request and receive messages from the communications application 120. The end user computing platforms may include navigation systems 124 associated with vehicles 126, personal computers 128, personal organizers (e.g., PDAs, PalmPilot®-type devices) 130, wireless phones 132, or any other types of computing devices that have the appropriate hardware and software to access the geographic database provider 110 over a data network 122.

The data network 122 may use any suitable technology and/or protocols that are currently available, as well as technology and/or protocols that become available in the future. For example, the data network may use WAP, TCP/IP, etc. More than one protocol may be used in the data network 122 with appropriate conversions. The data network 122 may be part of, or connected to, the Internet. A portion of the network 122 may include a wireless portion 134. The wireless portion 134 of the data network 122 enables two-way communication between the mobile end user computing platforms and the geographic database provider 110. The wireless portion 134 may be implemented by any suitable form of wireless communication, including cellular, PCS, satellite, FM, radio, or technologies that may be developed in the future. The wireless portion 134 may include one or more transmitters 136, such as a transponder tower, an antenna tower, an FM tower, satellites, or other suitable means. The transmitters 136 include an appropriate communication link 138 to the network 122 and/or database provider 110. This link 138 may be land-based or may be wireless. The transmitters 136 include suitable technology that enables two-way communication between the database provider 110 and the mobile end user computing platforms.

Included among the server applications 116 are the updates application 118 and the communications application 120. The updates application 118 uses the master geographic database 112 associated with the server 114 to provide the various different types of updates to the end user computing platforms. In one embodiment, the communications application 120 interfaces with a data network 122 in order to receive messages requesting updates from the end user computing platforms and to send messages comprising the requested updates to the end user computing platforms.

Briefly, in one embodiment, one of the end user computing platforms sends a message to the geographic database provider 110 requesting an update to the geographic database associated with the computing platform. Generally, the message identifies the end user and version of the end user's geographic database. The message may also include a prior update history with dates of prior update transactions. Furthermore, the message indicates a type of update requested. The types of updates will be described in more detail below. The communication application 120 and updates application 118 on the server 116 receive and process the message requesting the update. The updates application 118 retrieves the necessary information from the master geographic database 112 and prepares a data package containing the data for the requested update. The communication application 120 sends a message with the data package to the end user computing platform. In one embodiment, the data package may be encrypted. The end user computing platform receives the message with the data package and if necessary processes the data package to obtain the update. The end user computing platform then stores the dataset of the update in associated memory. For example, when the end user computing platform includes a navigation system, such as the navigation system 10 in FIG. 1, the dataset of the update is stored in the storage device 28, such as a hard drive. The navigation application software programs 20 may then use the geographic database 26 including the dataset on the storage medium, such as CDROM or DVD, and the dataset of the update on the storage device when providing navigation-related features and functions.

The types of updates may be viewed as having three possible variables. A first variable for updates is either a continental update or a regional update. The continental update includes all of the changes to the geographic dataset for an entire continental geographic area, such as North America. In contrast, the regional update includes changes to the geographic dataset for a portion of continental geographic area, such as an established region comprising several states or countries, an individual state or country, a metropolitan area, a county, a city, and so on. For example, the continental geographic area of North America may be partitioned into several regions with each of the regions being separated by boundaries. For example, a boundary may separate a region containing the state of Indiana from a region containing the state of Illinois.

Another variable for updates is either full parcel replacement or parcel deltas. The full parcel replacement update replaces the entire contents of any previous dataset included in the parcel with an entirely new dataset. In contrast, the parcel deltas update generates a list of deltas or data value changes and instructions on how to apply the data value changes to transform the previous dataset included in the parcel into a new dataset. A further variable for updates is either complete update or selective update. The complete update replaces all of the data at each subset and each layer, such as replacing the routing data subset, cartographic data subset, maneuver data subset and points-of-interest data subset. In contrast, the selective replacement only replaces selected data in specified subsets and layers. For example, the selective update may only replace the points-of-interest data subset.

In one embodiment, the geographic database provider 110 provides updates comprising each of the three variables: 1) continental or regional, 2) full parcel or parcel deltas, and 3) complete or selective. An update comprising a continental-full parcel-complete update is equivalent to completely replacing the previously released end user geographic database 26. All other updates, such as regional-full parcel-complete update, regional-parcel deltas-complete update, regional-full parcel-selective update and so on, are considered to be incremental updates because the entire previously released geographic dataset is not fully replaced by the data provided by the update. With incremental updates, the end user geographic database comprises both data from a previously released geographic dataset and data from the update transaction. For convenience, the term "updated data" refers to the portion of geographic dataset of the end user geographic database provided by an update transaction, and the term "un-updated data" refers to the portion of the geographic dataset of the end user geographic database provided by previously released geographic data including prior update transactions having a earlier date than the updated data.

Other alternative embodiments for the system for providing updates to end user geographic databases exist in addition to the system shown in FIG. 8. In another embodiment, the geographic database provider 110 may provide updates to end user geographic databases using storage medium, such as memory cards, portable hard drives, CDROM, DVD and so on. Rather than communicating the updates via the data network 122, the updates are stored on the storage medium and physically transported to the end user computing platform and loaded into associated memory of the computing platform. In other embodiments, other methods of providing the updates to the end user are possible.

IV. Identifying and Reporting Possible Inconsistencies Between Updated and Un-Updated Data Whenever incremental updates are provided to the end user computing platforms, such as the navigation system 10 of FIG. 1, inconsistencies may exist between the updated data and the un-updated data. That is, the updated data provides a more current representation of the geographic region from the master geographic database whereas the un-updated data provides a less current representation of the geographic region. Differences between the more current representation and the less current representation of the geographic region may exist. For example, new roads are built, and the more current representation of the geographic region may correctly reflect the new roads, while the less current representation may not include the new roads.

Accordingly, in one embodiment, the navigation system 10 includes a data inconsistency check application 44. The data inconsistency check application 44 identifies the presence of inconsistencies or possible inconsistencies between updated data and un-updated data and reports to the end user about the inconsistencies or possible inconsistencies. In one embodiment, the data inconsistency check application 44 runs in parallel with another of the navigation application software programs 20, such as route calculation 34 and map display 38. In another embodiment, the data inconsistency check application 44 is incorporated into the navigation application software programs 20. For example, in this embodiment, the route calculation application 34 would perform the data inconsistency check, and the map display application 38 would perform the data inconsistency check.

Figure 9:
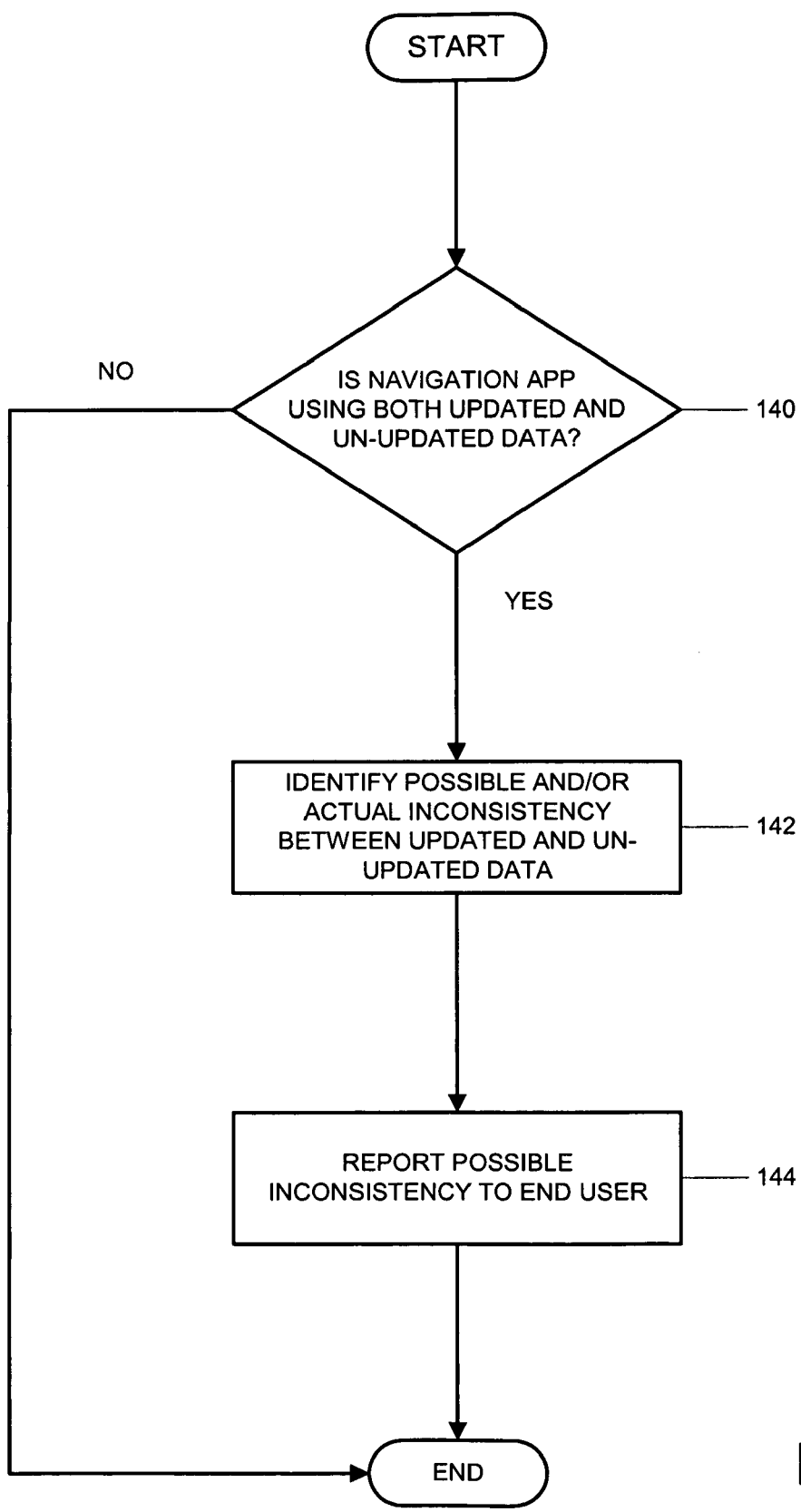
FIG. 9 is a flow chart of a process for identifying and reporting possible inconsistencies between updated and un-updated geographic data, according to an exemplary embodiment.

FIG. 9 illustrates a flow chart of the steps performed by the data inconsistency check application 44. At step 140, the data inconsistency check application 44 determines whether the currently executing navigation application software program 20 is using both updated data and un-updated data. In one embodiment, the application 44 accesses an updates history file associated with the geographic database 26. The updates history file lists a history of update transactions with corresponding dates and versions information for the associated geographic database 26. For example, the updates history file lists the regions, parcels, subsets and/or levels of geographic data that have been changed and associated dates and/or version numbers from update transactions for the geographic database 26. By reviewing the updates history file, the application 44 determines whether the current navigation application software program 20 uses data from the geographic database 26 that has different update history information, such as a portion of the data used by the navigation application has an update date of Jul. 1, 2004 while another portion has an update date of Jul. 1, 2003.

In another embodiment, the application 44 accesses date and/or version information from each parcel header of the parcels accessed for the navigation application software program 20. In this embodiment, each parcel includes a parcel header that contains information regarding the date on which the dataset of the parcel was created or changed by an update transaction. By reviewing the date and/or version information from the parcel headers of each parcel accessed by the current navigation software program 20, the application 44 determines whether the current navigation application software program 20 uses data from the geographic database 26 that has different associated dates, such as one of the parcel headers of the data used by the navigation application has an update date of Jul. 1, 2004 while another has an update date of Jul. 1, 2003.

In a further embodiment, the application 44 may review date and/or version information associated with data records accessed for the current navigation application software program 20. By reviewing the date and/or version information from each data record used by the current navigation software program 20, the application 44 determines whether the current navigation application software program 20 uses data from the geographic database 26 that has different associated dates, such as one of the data records used by the navigation application has an associated date of Jul. 1, 2004 while another data record has an associated date of Jul. 1, 2003.

If the answer to step 140 is no, the data inconsistency check application 44 ends because all of the geographic database records used by the currently executing navigation application software program 20 have the same date and/or version information so no inconsistencies between updated and un-updated data will occur. If the answer to step 140 is yes, the data inconsistency check application 44 identifies possible inconsistencies or actual inconsistencies between the updated data and un-updated data at step 142. In one embodiment, the application 44 automatically identifies possible inconsistencies between the updated data and un-updated data when the application determines that the currently executing navigation software program, such as the map display application 38, uses both updated data and un-updated data. In another embodiment, the application 44 identifies the currently executing application software program 20 and identifies how possible inconsistencies between the updated and un-updated data may affect the output of the currently executing application software program 20. Detailed examples of embodiments for identifying possible inconsistencies between updated and un-updated geographic data are explained in detail below. For example, the application 44 identifies the currently executing application software program 20 as the route calculation application 34 and if the route calculation application cannot identify a route from the specified origin to the specified destination, the application 44 identifies that possible inconsistencies between the updated and un-updated data may have caused the failure of the route calculation application. Further, for example, the application 44 identifies the currently executing application software program 20 as the map display application 38, and the application 44 identifies that possible inconsistencies between the updated and un-updated data may caused the map presented on the display to lack visual connection between roads that cross region boundaries.

At step 144 of FIG. 9, the data inconsistency check application 44 reports the possible inconsistency or identified inconsistency to the end user of the computing platform 12. In one embodiment, the application 44 provides the report via the user interface 24. The report may be displayed on a display screen and/or provided through audio speakers of the user interface 24. In one embodiment, the report describes a specific inconsistency between the updated and un-updated geographic data. In another embodiment, the report indicates a possible inconsistency between the updated and un-updated geographic data. Additionally, the report may indicate the respective dates of the updated and un-updated geographic data. Detailed examples of embodiments for identifying and reporting possible inconsistencies between updated and un-updated geographic data are explained below.

A. EXAMPLE 1

Figure 10A:
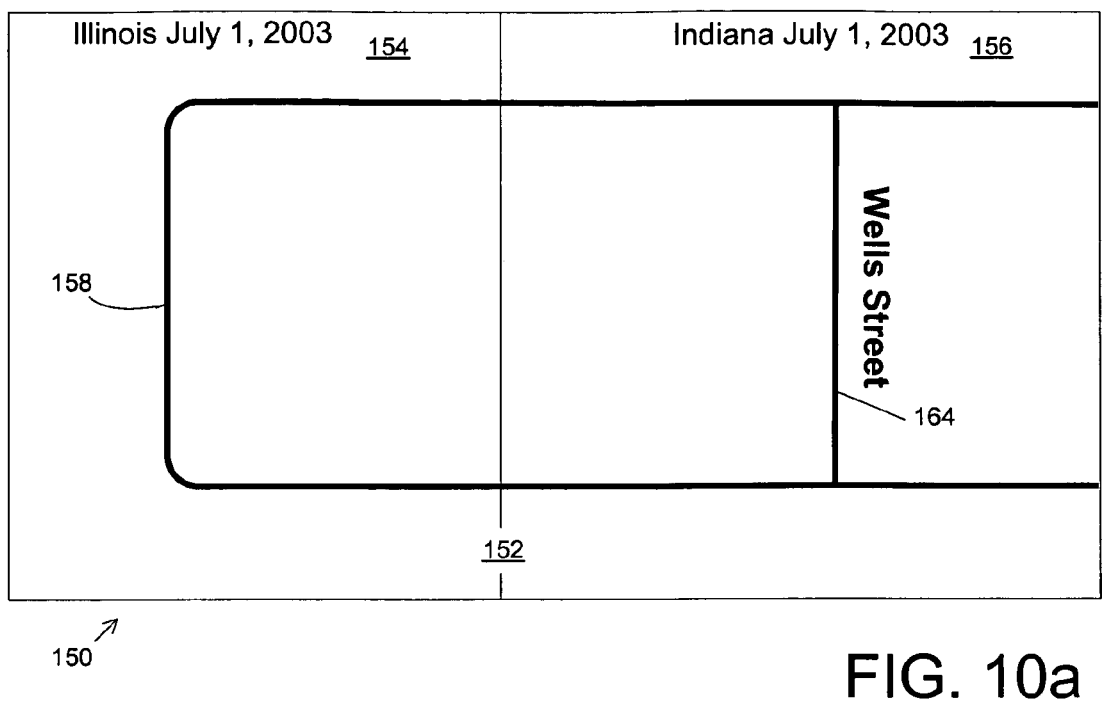
FIG. 10a shows a map of a geographic region as represented by a master geographic database on Jul. 1, 2003.
Figure 10B:
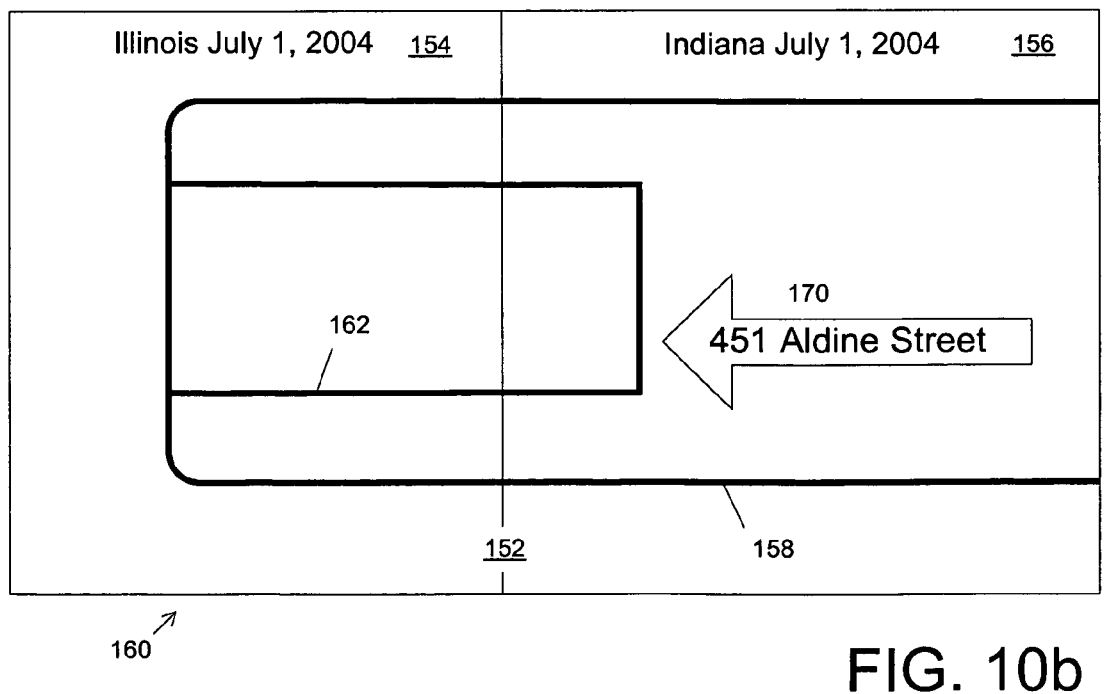
FIG. 10b shows a map of a geographic region as represented by a master geographic database on Jul. 1, 2004.

Example 1 illustrates a case where features, such as road segments and/or nodes, have been added or removed across a boundary between an updated region and un-updated region. FIG. 10*a* illustrates a map 150 of a geographic region 152 represented in the master geographic database 112 on Jul. 1, 2003. The geographic region 152 includes an Illinois portion 154 and an Indiana portion 156. The region 152 includes a road 158 that runs from the Indiana portion 156 into the Illinois portion 154 and then curves back into the Indiana portion 156. FIG. 10*b* illustrates a map 160 of the geographic region 152 represented in the master geographic database 112 on Jul. 1, 2004. Between Jul. 1, 2003 and Jul. 1, 2004, a new road 162 called Aldine Street has been constructed, a road 164 called Wells Street was torn down, and the master geographic database 112 has been modify to represent the new features of the geographic region 152.

Figure 11A:
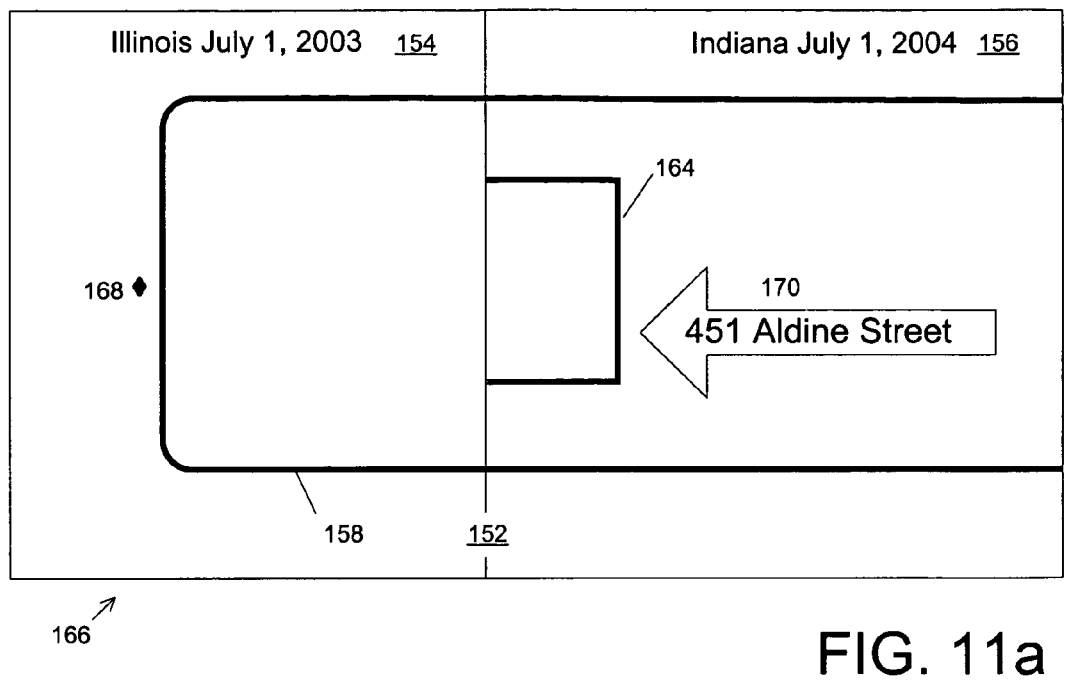
FIG. 11a shows a map of a geographic region as represented by an end user's geographic database containing updated and un-updated geographic data.

In the present example, an end user has a navigation system 10 as illustrated in FIG. 1. The navigation system 10 includes the geographic database 26 that contains data representing the geographic region 152. The geographic database 26 originally contains a geographic dataset from the master geographic database 112 corresponding to Jul. 1, 2003. On Jul. 1, 2004, the end user of the navigation system 10 obtains a regional, full parcel, complete update that includes the Indiana portion 156 but not the Illinois portion 154. Because the end user obtained the update for only the Indiana portion 156, the geographic database 26 contains a geographic dataset that represents a map 166 of the geographic region 152 as illustrated in FIG. 11*a*. That is, the Illinois portion 154 is un-updated comprising data from Jul. 1, 2003, whereas, the Indiana portion 156 is updated comprising data from Jul. 1, 2004.

For the present example, the end user requests a route from a current location 168 to 451 Aldine Street 170. In one embodiment, the route calculation application 34 attempts to create a route from the location 168 to the location 170 comprising a series of interconnected road segments. However, the route calculation application 34 cannot create the route from the location 168 to the location 170 because the un-updated Illinois portion 154 does not include the connecting road segment 162 (see FIG. 10*b*). In one embodiment, the data inconsistency check application 44 identifies that the route calculation application 34 uses both un-updated data corresponding to the Illinois portion 154 and updated data corresponding to the Indiana portion 156, namely, data representing road segments 158 and 164. In one embodiment, the application 44 identifies that the parcel header corresponding to the Illinois portion 154 has an associated date of Jul. 1, 2003 while the parcel header corresponding to the Indiana portion 156 has an associated date of Jul. 1, 2004.

Figure 11B:
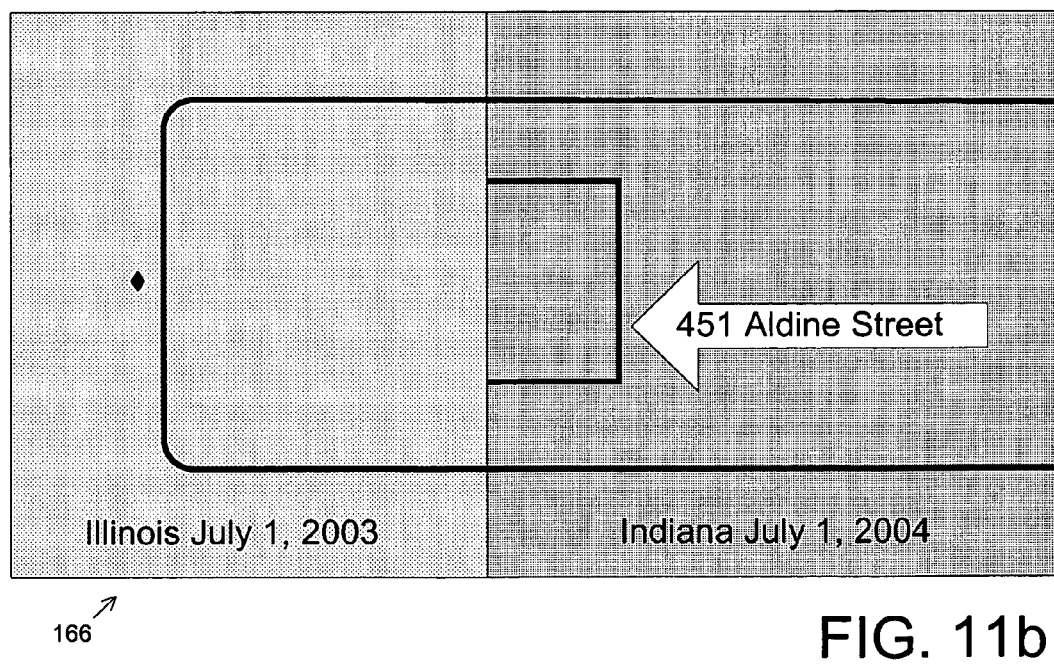
FIG. 11b shows a map display of a navigation system reporting possible inconsistencies between updated and un-updated geographic data.

In the present example, the data inconsistency check application 44 identifies a possible inconsistency between the updated and un-updated data by determining that the route calculation application 34 cannot provide a route. Additionally, the data inconsistency check application 44 reports the inconsistency between the updated and un-updated data by providing a messages through the user interface 24, either as text on the display screen or as audio, that the route calculation feature may have failed because the geographic database needs further updates, namely, updates for the Illinois portion 154. In another embodiment, the data inconsistency check application 44 reports the inconsistency by providing a map display as illustrated in FIG. 11*b*. In FIG. 11*b*, the un-updated Illinois portion 154 is displayed with a background color and/or pattern different from a background color and/or pattern of the updated Indiana portion 156. Additionally, a date associated with the data set that represents the Illinois portion and a date associated with the data set that represents the Indiana portion may be displayed on the map 166.

B. EXAMPLE 2

Example 2 illustrates a case where shape point(s) that cross a boundary between an updated region and an un-updated region have been repositioned; shape points represent the shape and position of features, such as road segments, rivers, lakes, and so on. FIG. 12 illustrates a map 180 of a geographic region 182 represented in the master geographic database 112 on Jul. 1, 2003. The geographic region 182 includes an Illinois portion 184 and an Indiana portion 186. The region 182 includes roads 188, 190, 192 and 194 that run from the Illinois portion 184 into the Indiana portion 186. FIG. 12 also illustrates a map 196 of the geographic region 182 represented in the master geographic database 112 on Jul. 1, 2004. During the year, the geographic database provider has repositioned the roads 188, 190, 192 and 194 to more accurately represent their actual physical location.

Figure 13A:
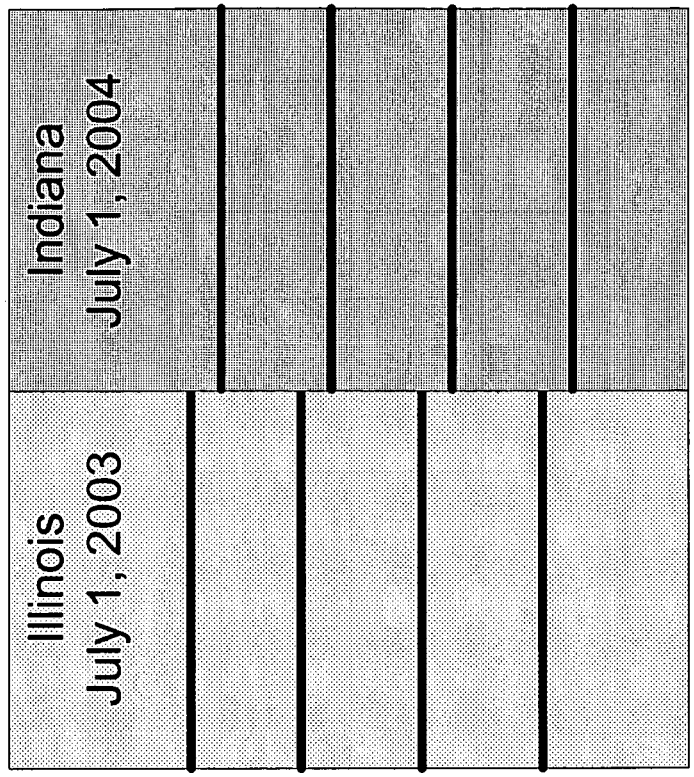
FIG. 13a shows a map of a geographic region as represented by a geographic database containing updated and un-updated geographic data.

In the present example, an end user has a navigation system 10 as illustrated in FIG. 1. The navigation system 10 includes the geographic database 26 that contains data representing the geographic region 182. The geographic database 26 originally contains a geographic dataset from the master geographic database 112 corresponding to Jul. 1, 2003. On Jul. 1, 2004, the end user of the navigation system 10 obtains a regional, full parcel, complete update that includes the Indiana portion 186 but not the Illinois portion 184. Because the end user obtained the update for only the Indiana portion 186, the geographic database 26 contains a geographic dataset that represents a map 198 of the geographic region 182 as illustrated in FIG. 13*a*. That is, the Illinois portion 184 is un-updated comprising data from Jul. 1, 2003, whereas, the Indiana portion 186 is updated comprising data from Jul. 1, 2004.

For the present example, the end user is traveling on road 190. In one embodiment, the map display application 38 creates a map of the area surrounding the current location of the end user for display on the user interface 24. In order to display the map, the map display application 38 obtains data representing the roads 188, 190, 192 and 194 from the geographic database 26. To create the map, the map display application 38 obtains data from both the un-updated Illinois portion 184 and the updated Indiana portion 186. FIG. 13*a* illustrates a map 198 created by the map display application 38. The map 198 has discontinuities for the roads 188, 190, 192 and 194 at the boundary 200 between the un-updated Illinois portion 184 and updated Indiana portion 186 because the roads are positioned differently in the updated Indiana portion 186 than the un-updated Illinois portion 184.

In one embodiment, the data inconsistency check 44 identifies that the map display application 38 uses both un-updated data corresponding to the Illinois portion 184 and updated data corresponding to the Indiana portion 186, namely data representing roads 188, 190, 192 and 194. In one embodiment, the data inconsistency check application 44 identifies that the parcel header corresponding to the Illinois portion 184 has an associated date of Jul. 1, 2003 while the parcel header corresponding to the Indiana portion 186 has an associated date of Jul. 1, 2004.

In the present example, the data inconsistency check application 44 automatically identifies that possible inconsistencies may likely exist between the updated and un-updated data by determining that the map display application 38 uses both un-updated data and updated data to create the map 198. Because any changes to the dataset that represents the Indiana portion 186 will be visible at the boundary 200 with the Illinois portion 184, the present embodiment automatically identifies the possibility of inconsistencies. In alternative embodiments, the application 44 may compare the position of shape points of features, such as road segments, that cross the boundary between the updated and un-updated region to determine if the road segments will connect at the boundary when displayed by the map display application.

Figure 13B:
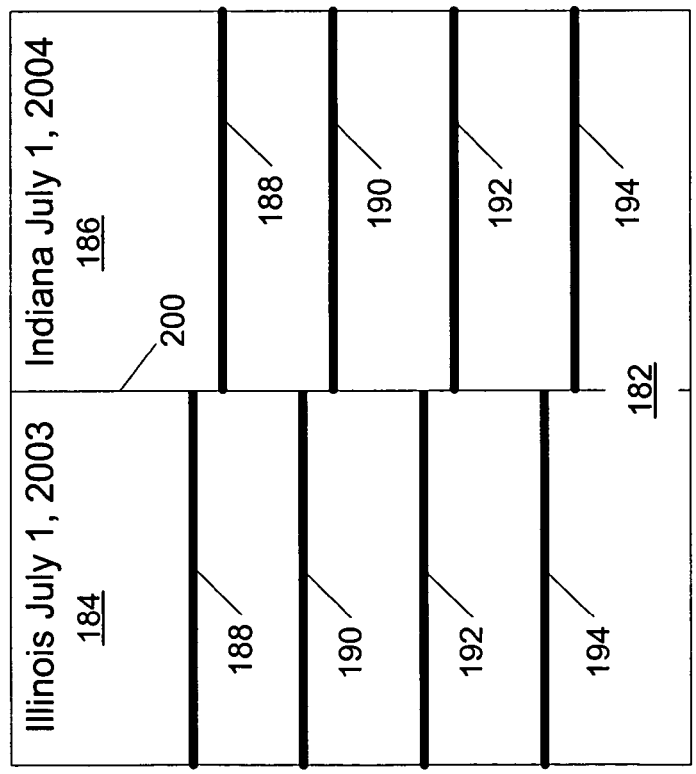
FIG. 13b shows a map display of a navigation system reporting possible inconsistency between updated and un-updated geographic data.

Additionally, the data inconsistency check application 44 reports the possible inconsistency between the updated and un-updated data by providing a map display as illustrated in FIG. 13*b*. In FIG. 13*b*, the un-updated Illinois portion 154 is displayed with a background color and/or pattern different from a background color and/or pattern of the updated Indiana portion 156. Furthermore, the un-updated Illinois portion 154 and updated Indiana portion 156 include labels indicating a date associated with the data used to create the map 198.

C. EXAMPLE 3

Example 3 illustrates a case where features, such as road segments, are added or removed in the higher layers of the geographic data of the geographic database. In one embodiment of the geographic database 26, higher level roads, such as interstate highways, are stored in multiple parcels in order to limit the amount of data that is needed to be read from the storage medium when the map display application 38 performs a zoom out operation. The higher layer parcels are less populated than the lower layer parcels and cover a larger area.

Figure 14A:
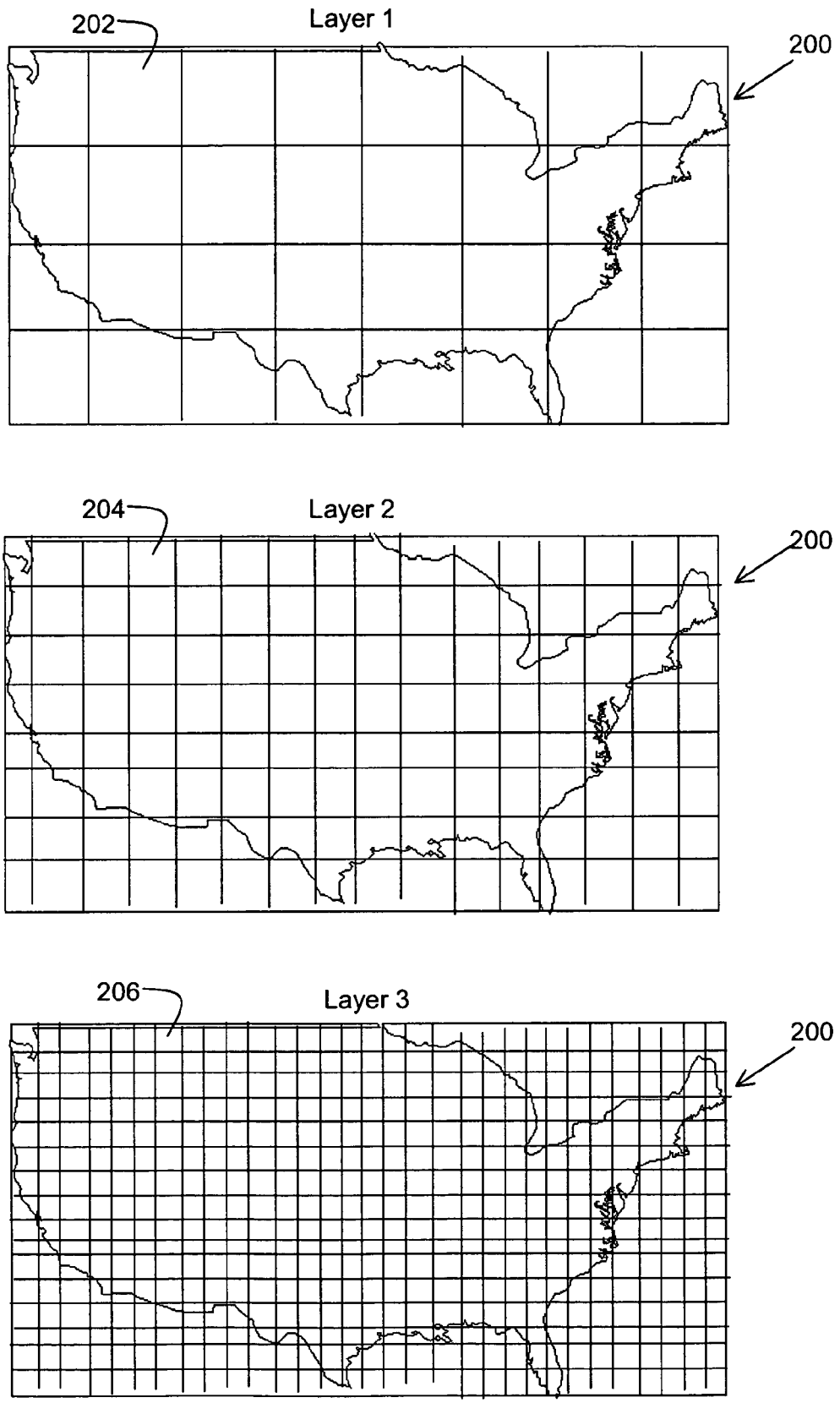
FIG. 14a shows maps of a geographic region parcelized at three different levels.
Figure 14B:
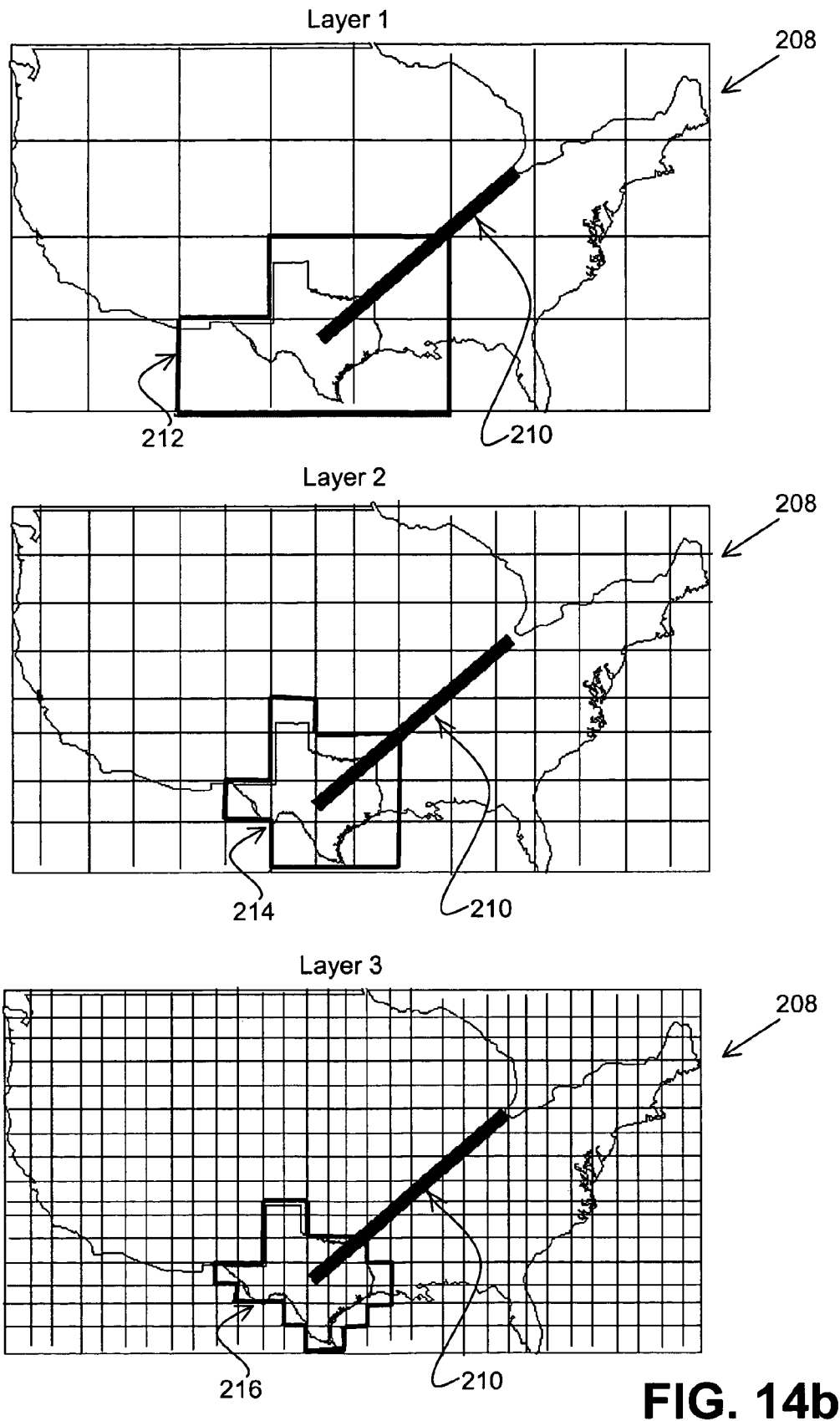
FIG. 14b shows maps of a geographic region parcelized at three different levels.

FIG. 14*a* illustrates a map 200 of a geographic region of the continental United States represented in the master geographic database 112 on Jul. 1, 2003. The continental United States is organized into parcels at three levels: layer 1, layer 2 and layer 3. Layer 1 includes parcels 202 containing only data related to interstate highways; layer 2 includes parcels 204 containing data related to interstate highways and intrastate roads; and layer 3 includes parcels 206 containing data related to interstate highways, intrastate roads and local roads. Accordingly, the layer 1 parcels cover the largest area, and the layer 3 parcels cover the smallest area. FIG. 14*b* also illustrates a map 208 of the continental United States represented in the master geographic database 112 on Jul. 1, 2004. During the year, a new interstate highway 210 has been constructed between Dallas, Tex. and Chicago, Ill.

In the present example, an end user has a navigation system 10 as illustrated in FIG. 1. The navigation system 10 includes the geographic database 26 that contains data representing the continental United States at layer 1, layer 2 and layer 3. The geographic database 26 originally contained data from the master geographic database 112 corresponding to Jul. 1, 2003. On Jul. 1, 2004, the end user of the navigation system 10 obtains a regional, full parcel, complete update for the state of Texas. The update for Texas includes: the parcels within boundary 212 for layer 1, the parcels within boundary 214 for layer 2, and the parcels within boundary 216 for layer 3. Because the end user obtained the update for only the region of Texas, the geographic database 26 contains a geographic dataset with updated data within the boundary 212 and un-updated data outside the boundary 212 for layer 1, updated data within the boundary 214 and un-updated data outside the boundary 214 for layer 2, and updated data within the boundary 216 and un-updated data outside the boundary 216 for layer 3.

For the present example, the end user is using a zooming function of the map display application 38 on the navigation system 10 while being located in Oklahoma. In one embodiment, the map display application 38 creates a map of the area surrounding the current location of the end user for display on the user interface 24. When the map display is zoomed in at layer 3, the map of the area surrounding the current location of the end user will not show the interstate 210 because the map display application uses data from the un-updated parcels outside the Texas boundary 212 of layer 3. If the map display is zoomed into layer 2, the interstate 210 will be shown in the southern portion of Oklahoma but not in the northern portion of Oklahoma on the map because the map display application uses data from the updated parcels within the Texas boundary 214 and un-updated parcels outside the Texas boundary 214 of layer 2. If the map display is further zoomed in to layer 1, the interstate 210 will be shown on the map because the map display application uses data from the updated parcels with the Texas boundary 216 of layer 1.

In one embodiment, the data inconsistency check 44 identifies that the map display application 38 when zooming between layers uses both updated data corresponding to the portions inside the Texas boundaries 212, 214 and 216 and un-updated data corresponding to the portions outside the Texas boundaries 212, 214 and 216. In one embodiment, the data inconsistency check application 44 identifies that the parcel header corresponding to the portions inside the boundaries 212, 214 and 216 have associated dates of Jul. 1, 2004 while the parcel header corresponding to the portions outside the boundaries 212, 214 and 216 have associated dates of Jul. 1, 2003.

In the present example, the data inconsistency check application 44 automatically identifies that possible inconsistencies may likely exist between the updated and un-updated data by determining that the map display application 38 uses both un-updated data and updated data to create the maps. In alternative embodiments, the application 44 may determine where the higher level roads, such as interstates, are included in the maps at the different zoom levels to identify actual inconsistency.

Additionally, the data inconsistency check application 44 reports the possible inconsistency and/or actual inconsistency between the updated and un-updated data by providing a message to the end user indicating that the zooming operation may include inconsistencies between updated and un-updated data. For example, the report may be an audio message when the zooming feature transitions between maps indicating that possible inconsistencies between updated data and un-updated data may be visible in the maps. Additionally, the report may display the un-updated portions of the map with a background color and/or pattern different from a background color and/or pattern of the updated portions. Furthermore, the un-updated portions and updated portions may include labels indicating a date associated with the data used to create the maps.

D. EXAMPLE 4

Example 4 illustrates a case where parcels contain data defined at different aggregation levels than an updated region. For example, in one embodiment, the geographic database includes a list of all cities in the United States. Suppose that the master geographic database 112 on Jul. 1, 2003 contains such a list of cities. Between Jul. 1, 2003 and Jul. 1, 2004 several new cities were developed in the United States, and the master geographic database 112 on Jul. 1, 2004 includes those new cities.

In the present example, an end user has a navigation system 10 as illustrated in FIG. 1. The navigation system 10 includes the geographic database 26 that contains data representing the geographic region 152. The geographic database 26 originally contains a geographic dataset from the master geographic database 112 corresponding to Jul. 1, 2003. On Jul. 1, 2004, the end user of the navigation system 10 obtains a regional, parcel delta, complete update that includes the state of Illinois and the list of all cities in the United States; however, the update excludes the state of California. Because the end user obtained the update that contains the list of all cities in the United States, the end user's geographic database includes new cities in California. However, because the end user did not obtain the update for California, the end user's geographic database does not include the features within those new cities in California.

For the present example, the end user requests a route from a current location in Los Angeles to a newly established city of Kaufmanville in the distant suburbs of Los Angeles. In one embodiment, the route calculation application 34 attempts to create a route from the current location to the new city of Kaufmanville comprising a series of interconnected road segments. Although the city of Kaufmanville is recognized from the list of all cities in the United States, the route calculation application 34 cannot create the route from the current location to Kaufmanville because the un-updated data that represents California does not include the connecting road segments of the new city. In one embodiment, the data inconsistency check application 44 identifies that the route calculation application 34 uses both un-updated data corresponding to the region of California and updated data corresponding to the list of all cities in the United States. In one embodiment, the application 44 identifies that the parcel header(s) corresponding to the geographic region of Los Angeles and surrounding suburbs of California have an associated date of Jul. 1, 2003 while the parcel header corresponding to the list of all cities in the United States has an associated date of Jul. 1, 2004.

In the present example, the data inconsistency check application 44 identifies a possible inconsistency between the updated and un-updated data by determining that the route calculation application 34 cannot provide a route. Additionally, the data inconsistency check application 44 reports the inconsistency between the updated and un-updated data by providing a messages through the user interface 24, either as text on the display screen or as audio, that the geographic database needs further updates. For example, the report may indicate that the end user needs to update the geographic database to obtain data representing Kaufmanville.

It is intended that the foregoing detailed description be regarded as illustrative rather than limiting and that it is understood that the following claims including all equivalents are intended to define the scope of the invention.

We claim:

1. A method of operating a navigation system that executes a navigation application software program to provide a navigation-related feature, the method comprising:
   identifying that said navigation application software program uses both updated geographic data and un-updated geographic data from a geographic database associated with said navigation system, wherein said un-updated geographic data has an associated date or version different from said updated geographic data; and
   providing a report indicating whether a problem due to an inconsistency between said updated geographic data and said un-updated geographic data may exist.

2. The method of claim 1 wherein said report comprises an audio message via a user interface associated with said navigation system.

3. The method of claim 1 wherein said report comprises a text message via a user interface associated with said navigation system.

4. The method of claim 1 wherein said report comprises a map display associated with said navigation system, wherein said map display shows a map of a geographic region related to said navigation-related feature, said map indicating a portion of the geographic region represented by said un-updated geographic data.

5. The method of claim 1 wherein said navigation application software program is a route calculation application.

6. The method of claim 1 wherein said navigation application software program is a map display application.

7. The method of claim 1 wherein said inconsistency is a geographic feature that crosses a boundary between a first portion of a geographic region and a second portion of the geographic region being represented differently in said first portion than said second portion, wherein said first portion of the geographic region is represented by said updated geographic data and said second portion of the geographic region is represented by said un-updated geographic data.

8. The method of claim 1 wherein said inconsistency is a geographic feature defined differently in separate subsets of data of the geographic database, wherein one of said subsets is said updated geographic data and another of said subsets is said un-updated geographic data.

9. The method of claim 1 further comprising identifying said inconsistency between the updated geographic data and the un-updated geographic data used by the navigation application software program.

10. The method of claim 1 wherein said identifying step accesses date or version information from each parcel header of a plurality of parcels accessed by said navigation application software program.

11. The method of claim 1 wherein said identifying step accesses an updates history file associated with said geographic database.

12. A navigation system comprising:
- a geographic database containing geographic data representing features in a geographic region, wherein said geographic database is capable of receiving an incremental update, wherein said incremental update changes a previously released geographic dataset of the geographic database to provide an updated dataset and an un-updated dataset, wherein said updated dataset including changes to said previously released geographic dataset and said un-updated dataset includes a portion of said previously released geographic dataset; and
- a navigation application software program determining whether both said updated geographic dataset and said un-updated geographic dataset are to be used to provide a navigation-related feature, wherein upon determining that the both datasets are to be used said navigation application software program determining whether said navigation system can provide said navigation-related feature without failure due to an inconsistency between said updated geographic dataset and said un-updated geographic dataset.

13. The navigation system of claim 12 further comprising a user interface providing a report indicating that an inconsistency between the updated geographic dataset and the un-updated geographic dataset may exist when said determining step determines that both said updated geographic dataset and un-updated geographic dataset are used.

14. The navigation system of claim 13 wherein said user interface comprises a map display showing a map of a geographic region related to said navigation-related feature, said map indicating a portion of the geographic region represented by said updated geographic dataset.

15. The navigation system of claim 12 wherein said navigation application software program is a route calculation application.

16. The navigation system of claim 12 wherein said navigation application software program is a map display application.

17. The navigation system of claim 12 wherein said incremental update is a regional update.

18. A method of operating a computing platform that executes a navigation application software program to provide a navigation-related feature, the method comprising:
- identifying whether a geographic database associated with said computing platform has undergone an incremental update, by comparing a first date associated with an updated dataset with a second date associated with an un-updated dataset, wherein said incremental update changes a previously released geographic dataset of the geographic database to provide said updated dataset and said un-updated dataset, wherein said updated dataset including changes to said previously released geographic dataset and said un-updated dataset includes a portion of said previously released geographic dataset; and
- providing a report indicating that said navigation-related feature uses both said updated dataset and said un-updated dataset by including said first date and said second date in said report.

19. The method of claim 18 further comprising determining whether an inconsistency between said updated dataset and said un-updated dataset exists.

20. The method of claim 19 further comprising reporting said inconsistency via a user interface of said computing platform.

* * * * *